US010240430B2

(12) United States Patent
McCormick

(10) Patent No.: US 10,240,430 B2
(45) Date of Patent: Mar. 26, 2019

(54) SUPERCHARGING PRESSURE IN A SUBSEA WELL SYSTEM

(71) Applicant: Transocean Sedco Forex Ventures Limited, Grand Cayman (KY)

(72) Inventor: Craig McCormick, Houston, TX (US)

(73) Assignee: Transocean Sedco Forex Ventures Limited, Grand Cayman (KY)

( * ) Notice: Subject to any disclaimer, the term of this patent is extended or adjusted under 35 U.S.C. 154(b) by 0 days.

(21) Appl. No.: 14/213,934

(22) Filed: Mar. 14, 2014

(65) Prior Publication Data

US 2014/0262308 A1 Sep. 18, 2014

Related U.S. Application Data

(60) Provisional application No. 61/800,862, filed on Mar. 15, 2013.

(51) Int. Cl.

| | |
|---|---|
| ***E21B 34/04*** | (2006.01) |
| ***F15B 1/027*** | (2006.01) |
| ***F15B 11/032*** | (2006.01) |
| ***E21B 29/12*** | (2006.01) |
| ***F16K 31/12*** | (2006.01) |
| ***E21B 34/10*** | (2006.01) |
| ***F16H 25/20*** | (2006.01) |

(Continued)

(52) U.S. Cl.
CPC .......... *E21B 34/04* (2013.01); *E21B 33/0355* (2013.01); *F15B 1/027* (2013.01); *F15B 11/032* (2013.01); *F15B 2211/212* (2013.01); *F15B 2211/251* (2013.01)

(58) Field of Classification Search
USPC .............................................................. 175/7
See application file for complete search history.

(56) References Cited

U.S. PATENT DOCUMENTS

| | | |
|---|---|---|
| 4,142,368 A | 3/1979 | Mantegani |
| 4,555,220 A | 11/1985 | Hall et al. |

(Continued)

FOREIGN PATENT DOCUMENTS

| | | |
|---|---|---|
| EP | 2136085 A2 | 12/2009 |
| JP | S53 102183 U | 8/1978 |

(Continued)

OTHER PUBLICATIONS

International Search Report and Written Opinion issued by the International Searching Authority for Application No. PCT/US2014/029516, dated Mar. 27, 2015, 9 pages.

(Continued)

*Primary Examiner* — Matthew R Buck
*Assistant Examiner* — Douglas S Wood

(57) ABSTRACT

Pressure in subsea systems, and accumulators of the subsea systems, may be increased through the use of a supercharge cylinder to generate higher pressures from an initial pressure provided from a surface vessel. The supercharge cylinder may include a piston that can be stroked to increase pressure stored in accumulators located near subsea systems, such as a blowout preventer (BOP). The increased pressure provided by the supercharge cylinder may allow the same number of accumulators to be used in the subsea system but allow additional effective hydraulic fluid to be stored in the accumulators.

21 Claims, 9 Drawing Sheets

(51) Int. Cl.

| | |
|---|---|
| ***F04B 35/00*** | (2006.01) |
| ***F04B 17/00*** | (2006.01) |
| ***F16B 3/00*** | (2006.01) |
| ***F16D 31/00*** | (2006.01) |
| ***E21B 33/035*** | (2006.01) |

(56) References Cited

U.S. PATENT DOCUMENTS

| | | | | |
|---|---|---|---|---|
| 6,981,428 | B2 * | 1/2006 | Donald | F16K 31/047 74/89.26 |
| 7,062,960 | B2 | 6/2006 | Couren et al. | |
| 7,137,450 | B2 * | 11/2006 | Johansen | E21B 33/0355 166/316 |
| 7,424,917 | B2 * | 9/2008 | Martin | B63C 11/52 166/319 |
| 7,503,385 | B2 * | 3/2009 | Tips | E21B 23/04 166/319 |
| 8,322,427 | B2 * | 12/2012 | Inderberg | E21B 47/1025 166/250.01 |
| 2005/0178560 | A1 * | 8/2005 | Johansen | E21B 23/04 166/374 |
| 2006/0231265 | A1 * | 10/2006 | Martin | 166/365 |
| 2007/0128053 | A1 * | 6/2007 | Stamper | F04B 9/133 417/397 |
| 2010/0084588 | A1 * | 4/2010 | Curtiss, III | E21B 34/16 251/57 |
| 2011/0284236 | A1 | 11/2011 | Baugh | |
| 2012/0324876 | A1 | 12/2012 | Fuselier et al. | |

FOREIGN PATENT DOCUMENTS

| | | | |
|---|---|---|---|
| JP | S63 39799 | A | 2/1988 |
| JP | H02 41836 | A | 2/1990 |
| JP | HO777205 | A | 3/1995 |
| WO | WO 2011/104662 | A1 | 9/2011 |

OTHER PUBLICATIONS

Supplementary Partial European Search Report issued by the European Patent Office for Application No. 14764354.8, dated Nov. 14, 2016, 3 pages.

Extended European Search Report issued by the European Patent Office for Application No. 14764354.8, dated Apr. 10, 2017, 12 pages.

Third Office Action issued by the Chinese Patent Office for Application No. 201480027743.6, dated Sep. 3, 2018, received Sep. 21, 2018, 15, pages including English translation.

* cited by examiner

SUPERCHARGING PRESSURE IN A SUBSEA WELL SYSTEM

CROSS REFERENCE TO RELATED APPLICATIONS

This applications claims the benefit of priority to U.S. Provisional Patent Application No. 61/800,862 to Craig McCormick filed Mar. 15, 2013 and entitled “Method and Apparatus for Supercharging Pressure in a Subsea Well System,” which is hereby incorporated by reference.

TECHNICAL FIELD

This disclosure is related to hydraulic systems. More specifically, this disclosure is related to increasing pressure in hydraulic systems.

BACKGROUND

Accumulators located near a blow-out preventer (BOP) and other subsea equipment may be configured to provide pressure for operating hydraulic systems, such as the blowout preventer (BOP). Subsea accumulators may store a combination of an inert gas and fluid. Initially, the subsea accumulator is charged with an initial pressure of gas, such as nitrogen. Fluid may then be pumped into the subsea accumulators to a final pressure, which may be equal to the BOP control system pressure. Compression of the gas within the subsea accumulator stores energy. The stored energy in the accumulator may be used to operate subsea equipment, such as when an emergency situation occurs resulting in a disconnect of energy from the surface. When the pressure of hydraulic fluid in the subsea system drops through use of the emergency system, the compressed gas expands, forcing the hydraulic fluid out of the accumulator and into the subsea system hydraulic lines.

When energy is supplied from the accumulators, in the absence of external energy such as from the surface, the pressure in the accumulators decreases over time as stored fluid energy is used for functions within the system. That is, as liquid is used from the accumulators, the pressure of the trapped gas decreases as a result of increasing volume for the gas, and the pressure within the subsea system hydraulic lines decreases. The decreased pressure in the fixed volume subsea system may result in limitations of components within the subsea system or through pressure limitations in the components or equipment used to convey the hydraulic fluid from the surface to the BOP. For example, a shear ram of a BOP may require a certain pressure level to shear a certain drillpipe in the event of an emergency. When that pressure level is not available from the accumulators, the BOP may fail to shear the drillpipe.

Additionally, when energy is supplied from the surface, the pressure within the subsea system may nevertheless be below an operating pressure for the subsea system. The drop in pressure from the surface to the subsea system may be due to leaks and other inefficiencies in the hydraulic fluid transfer system. Also, the drop in pressure may be from pressure limitations in the lines that convey the fluid from surface.

One conventional solution may be to increase the number of accumulators. Each additional accumulator provides an increase in the available volume of hydraulic fluid for operating the subsea systems. However, the additional accumulators may lead to an increased blowout preventer (BOP) stack weight and size, which is prohibitive to construction, installation, operation, and maintenance of the BOP or prohibitive to retrofitting additional accumulators onto a BOP stack. Thus, there is a need for providing increased pressure in a subsea system.

BRIEF SUMMARY

Pressure in subsea systems, and accumulators of the subsea systems, may be increased through the use of a supercharge cylinder to generate higher pressures from an initial pressure provided from a surface vessel. The supercharge cylinder may include a piston that can be stroked to increase pressure stored in accumulators located near subsea systems, such as a blowout preventer (BOP). The increased pressure provided by the supercharge cylinder may allow the same number of accumulators to be used in the subsea system but allow additional effective hydraulic fluid to be stored in the accumulators.

According to one embodiment, an apparatus may include an accumulator or a plurality of accumulators configured to store hydraulic fluid and gas; a supercharge cylinder; a hydraulic line coupling the accumulator to the supercharge cylinder; and/or a supercharge cylinder control valve coupled to the supercharge cylinder. The supercharge cylinder control valve may be configured to stroke the supercharge cylinder to increase a pressure at the hydraulic line The apparatus may also include a control module to perform the steps of charging an accumulator to a base control system pressure; stroking a supercharge cylinder to increase accumulator pressure above the base control system pressure to an increased system pressure; and/or repeatedly stroking the supercharge cylinder to increase accumulator pressure to a desired pressure above the base control system pressure. The apparatus may also include a pressure regulator coupled to the accumulator and configured to limit an output of the accumulator and/or a shear ram coupled to the accumulator and configured to operate from pressure supplied by the accumulator, in which the accumulator may be attached to a blowout preventer (BOP).

According to another embodiment, a method may include charging an accumulator to a base control system pressure; and/or stroking a supercharge cylinder to increase accumulator pressure above the base control system pressure to an increased system pressure.

The method may also include stroking the supercharge cylinder in to fill a supercharge chamber of the supercharge cylinder with new fluid from a reservoir at a surface; repeatedly stroking the supercharge cylinder to increase accumulator pressure to a desired pressure above the base control system pressure; limiting an output pressure of the accumulator to a regulated pressure; and/or performing a function with the increased system pressure, such as performing an emergency action on a blowout preventer (BOP) including an shearing a drillpipe.

According to yet another embodiment, an apparatus may include a supercharge cylinder including a piston with fluid stored on a first side of the piston and a second side of the piston; a first input for receiving fluid on a first side of the piston at a base control system pressure; a second input for receiving fluid on a second side of the piston at the base control system pressure; and/or an output at the first side of the piston for outputting an increased pressure above a base control system pressure. The apparatus may also include a supercharge control valve coupled to the supercharge cylinder, the valve configured to provide fluid to the first side of the piston and to the second side of the piston.

The apparatus may also include a hydraulic line coupled to the output of the supercharge cylinder; an accumulator coupled to the hydraulic line; a first one-way valve configured to provide the base control system pressure to the accumulators; a second one-way valve configured to block fluid from exiting the supercharge cylinder through the second input; and/or a second one-way valve configured to block fluid from exiting the supercharge cylinder through the output when the supercharge cylinder is charging.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
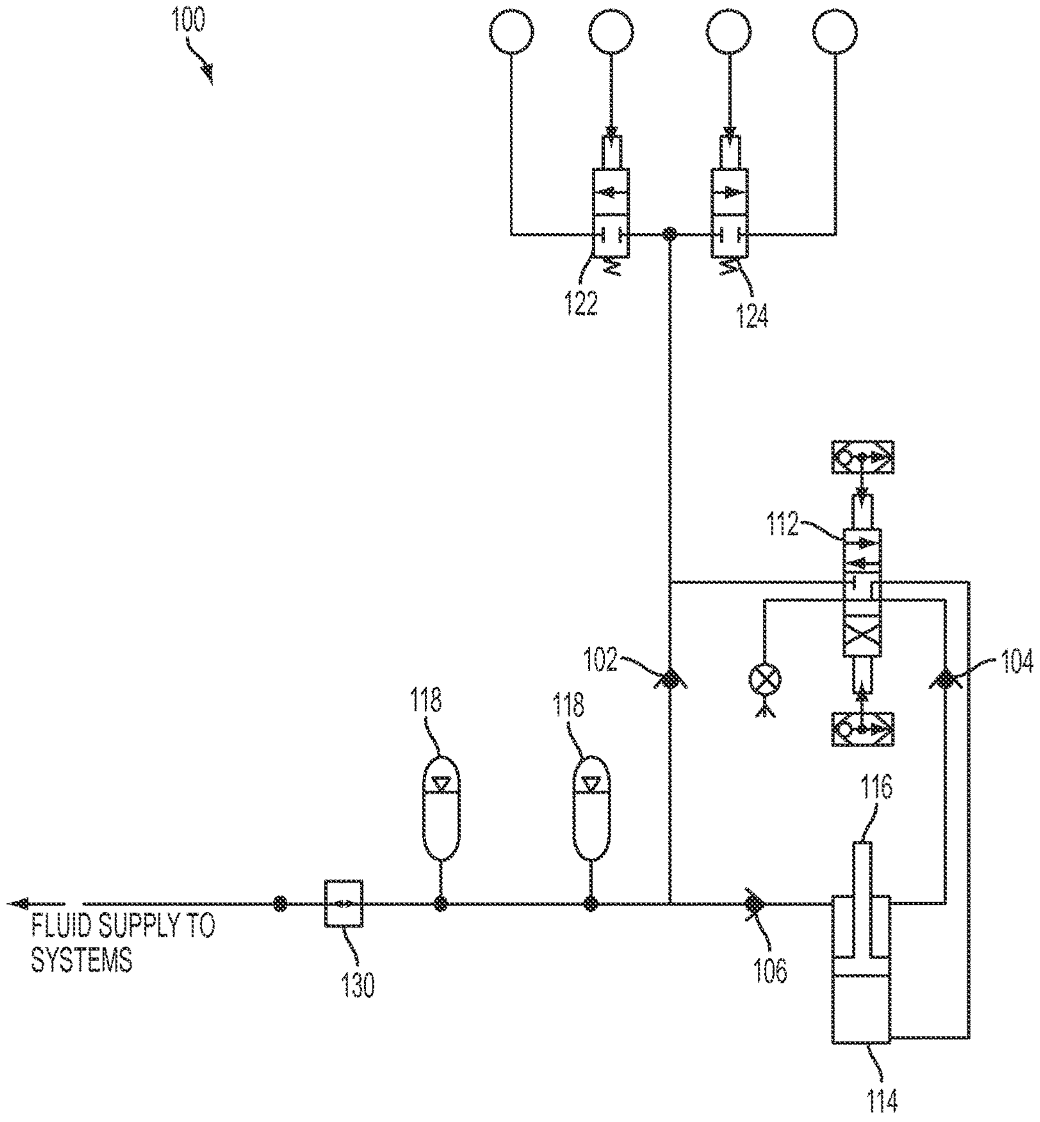
FIG. 1 is a schematic illustrating a system for supercharging pressure in a subsea system according to one embodiment of the disclosure.

FIG. 1 illustrates a system for supercharging pressure in a subsea system according to one embodiment of the disclosure. A system 100 may include valves 122 and 124 connecting a subsea system to an energy source, such as a pressurized hydraulic system at the surface or a pressurized hydraulic source supplied by a remote operated vehicle (ROV) coupled to the subsea system 100. Accumulators 118 may be coupled near subsea equipment and store energy to operate hydraulic systems of the subsea system 100.

A supercharge control valve 112 may redirect pressure to a supercharge cylinder 114 having a piston 116. The piston 116 may have a diameter of, for example, between approximately 2 inches and 50 inches with a rod diameter of, for example, between 1 inch and 10 inches, and a stroke length of, for example, between approximately 5 inches and 20 feet. In one embodiment, the piston 116 has a piston diameter of 5 inches with a rod diameter of 3.875 inches and a stroke length of 34 inches.

One way valves 102, 104, and 106 may be opened or closed to operate the subsea system 100 along with the supercharge control valve 112. When a supercharge control valve 112 is activated, pressure may be directed into the supercharge cylinder 114 to move the piston 116 upward in the cylinder 114.

In one embodiment, a pressure regulator 130 may be coupled to an output of the accumulators 118 to limit the pressure provided to subsea systems, such as emergency systems on a blowout preventer (BOP), to prevent damage to these components that may not be designed to handle higher pressures. A maximum pressure may also be regulated by selecting a desired ratio for surface area on a first side of the piston 116 and an opposing second side of the piston 116. The fixed surface area ratio of the piston 116 may act as a self-limiting regulator on the supercharged pressure when the pressure at the source at the surface is fixed.

Figure 2:
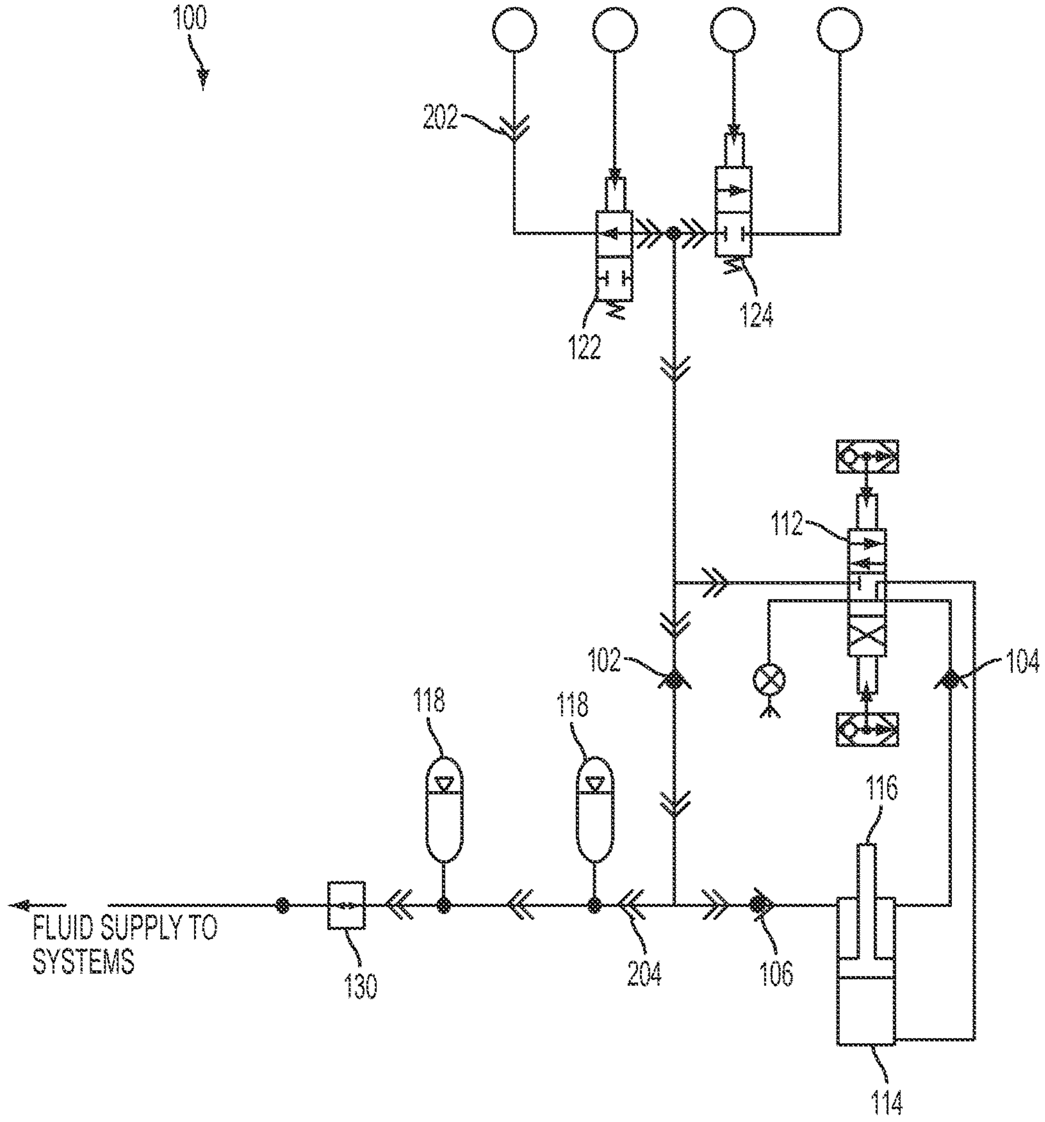
FIG. 2 is a schematic illustrating a system configured to charge accumulators according to one embodiment of the disclosure.

FIG. 2 illustrates a system configured to charge accumulators according to one embodiment of the disclosure. The accumulators 118 may be charged from an external source, such as at the surface, to a base control system pressure. The valve 122 may open to allow pressure 202 to propagate to the supercharge control valve 112. Because the supercharge control valve 112 is closed, the pressure 202 does not charge the supercharge cylinder 114. The valve 102 may be open allowing the pressure 202 to propagate to pressure 204 and into the accumulators 118. The valve 106 may be closed such that the pressure 202 does not reach the supercharge cylinder 114.

Figure 3:
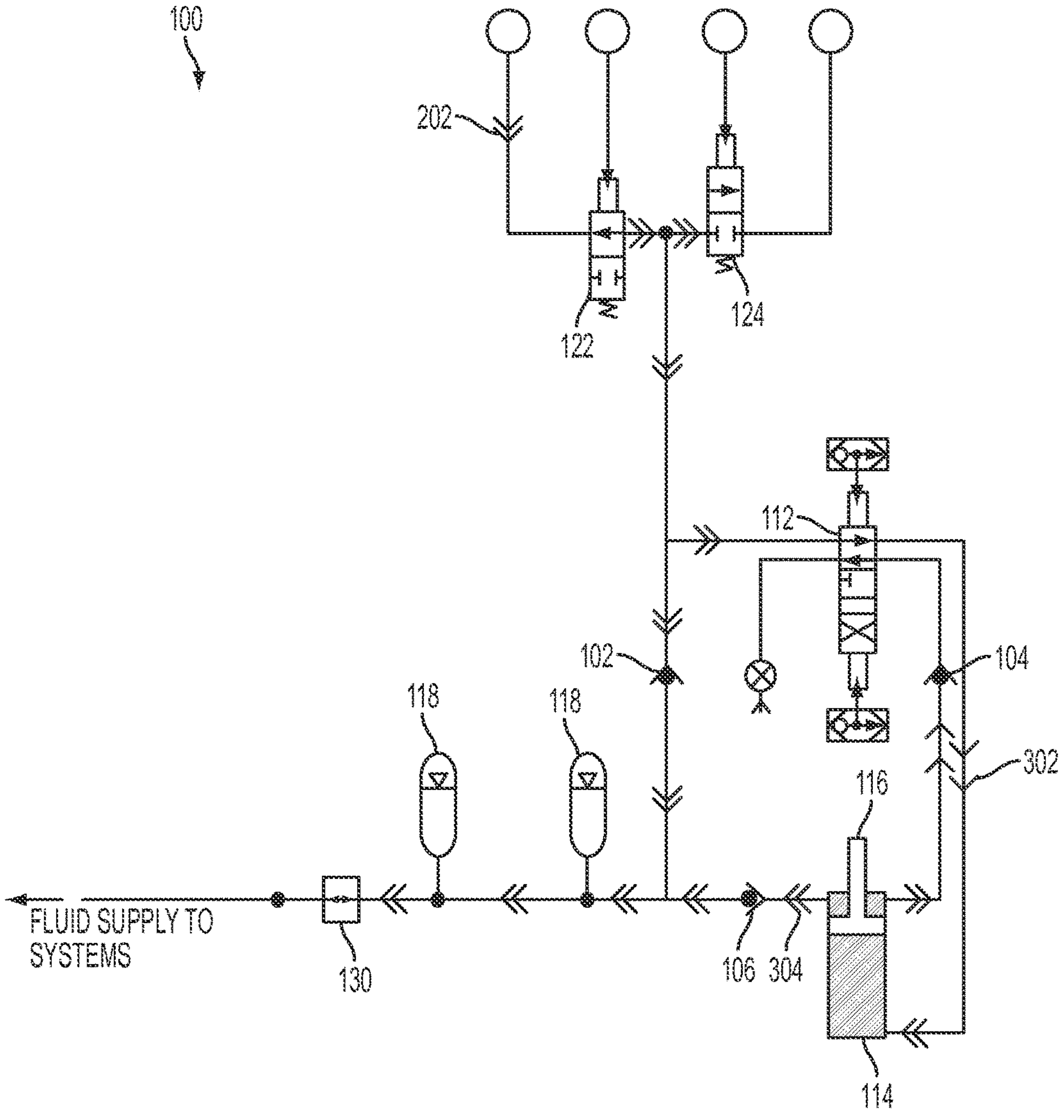
FIG. 3 is a schematic illustrating a system configured to stroke the supercharge cylinder according to one embodiment of the disclosure.

FIG. 3 is a system configured to stroke the supercharge cylinder 114 according to one embodiment of the disclosure. The supercharge control valve 112 may open to allow the pressure 202 to propagate to pressure 302 to the supercharge cylinder 114 and advance the piston 116 in the cylinder 114. The valve 106 may be open such that as the piston 116 advances upward, pressure is increased in the fluid above a bottom surface of the piston 116. The increased pressure in the cylinder 114 may result in increased pressure 304 in the hydraulic lines of the subsea system. The valve 104 may be closed to prevent exit of pressure from the input of the supercharge cylinder 114 forcing the increased pressure to the accumulators 118. The accumulators 118 and other subsea equipment may operate at a pressure above base control system pressure. In one embodiment, multiple superchargers 114 or accumulators 118 may be configured to achieve fixed steps in the increased base control system pressure, such as 5000, 7500, and 10000 psi. In another embodiment, a single accumulator may be charged and regulated to provide the fixed steps in the increased base control system pressure.

Figure 4:
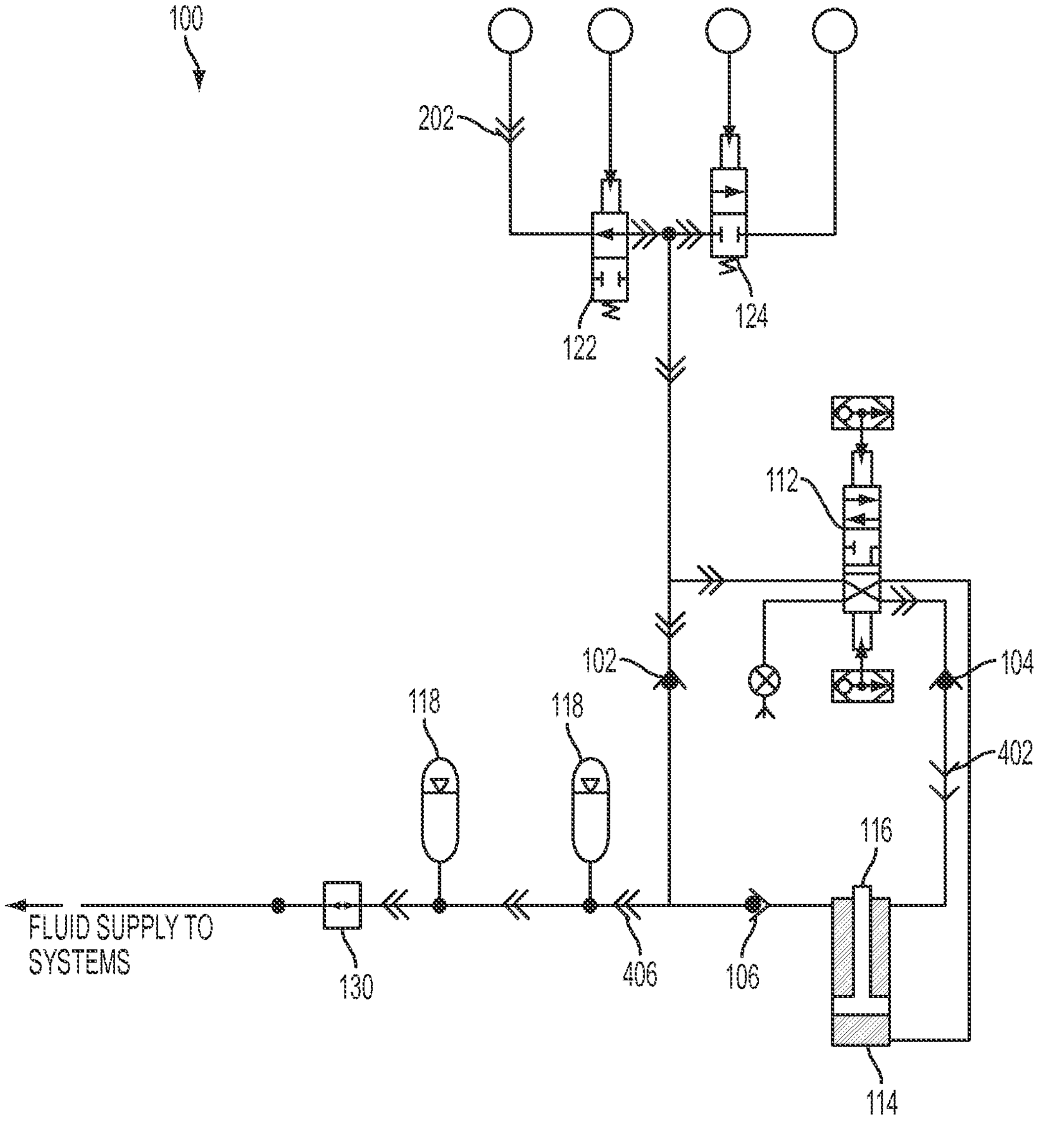
FIG. 4 is a schematic illustrating a system configured to stroke the supercharge cylinder to fill with new fluid according to one embodiment of the disclosure.

FIG. 4 is a system configured to stroke the supercharge cylinder to fill with new fluid according to one embodiment of the disclosure. The valves 112 and 104 may open to allow the pressure 202 to propagate to the supercharge cylinder 114. The valve 106 may close, and the pressure 202 propagates to pressure 402 to return the piston 116 to a bottom position of the cylinder 114. The pressure 202 may continue to propagate to the pressure 406 to operate subsea equipment and maintain the accumulators 118 at base control system pressure. The supercharge cylinder 114 allows increased pressure above base control system pressure at the accumulators 118 and other subsea equipment attached to hydraulic lines of the subsea system. Operation of the supercharge cylinder as shown in FIG. 4 assumes previous operation of the supercharge cylinder as shown in FIG. 2 and FIG. 3 such that pressure 406 and pressure at the accumulators 118 are above the pressure 202. Thus, the valves 102 and 106 may remain closed as the pressure 406 is higher than the pressure 402.

Figure 5:
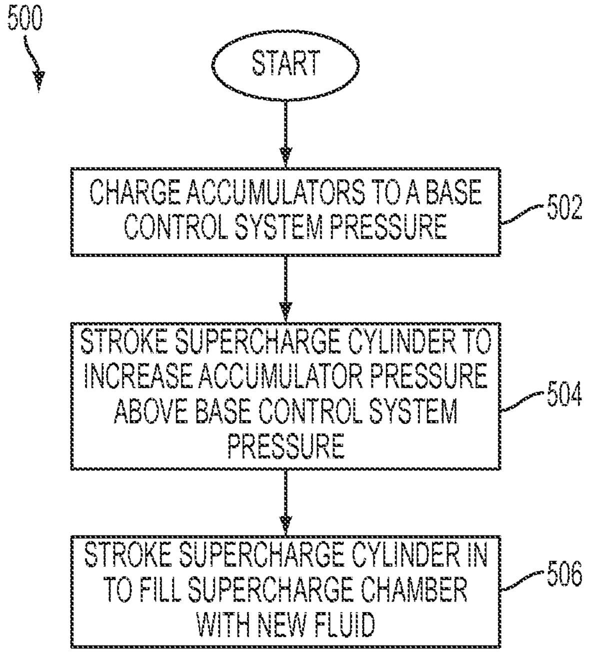
FIG. 5 is a flow chart illustrating one method of supercharging a hydraulic system according to one embodiment of the disclosure.

FIG. 5 is a flow chart illustrating one method of supercharging a hydraulic system according to one embodiment of the disclosure. Increased pressure in a hydraulic system may be achieved through the method 500, which begins at block 502 with charging accumulators to a base control system pressure. At block 504, a supercharge cylinder is stroked to increase accumulator pressure above a base control system pressure. At block 506, the supercharge cylinder is stroked in to fill a supercharge chamber of the supercharge cylinder with new fluid. Operation of a system with a supercharger cylinder as described in blocks 502, 504, and 506 are generally described with respect to a particular system shown in FIG. 2, FIG. 3, and FIG. 4.

Figure 6:
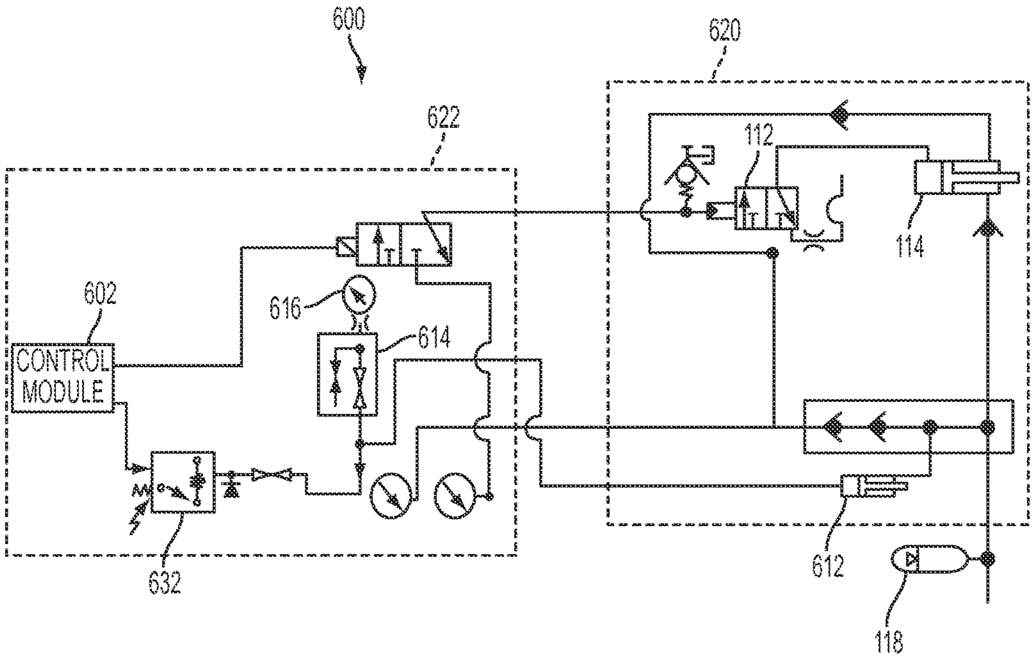
FIG. 6 is a schematic illustrating a system configured to provide feedback regarding a supercharged pressure according to one embodiment of the disclosure.

The increased pressure in the hydraulic system may be monitored and the monitored pressure provided as feedback to a pressure control module to obtain a desired pressure within the hydraulic system. FIG. 6 is a schematic illustrating a system configured to provide feedback regarding a supercharged pressure according to one embodiment of the disclosure. A control module 602 may receive information from a pressure sensor 632 coupled to a line coupled to the accumulator 118 and/or coupled to a high pressure side of the supercharge cylinder 114. In one embodiment, a deintensifier 612 may couple the pressure sensor 632 to the line coupled to the accumulator 118. The deintensifier 612 may provide an output pressure to the sensor 632 at a fixed ratio or fixed offset from the pressure in the line coupled to the accumulator 118, which allows the pressure sensor 632 to be a low pressure sensor 632. A pressure readout 616 and an isolation valve 614 may also be coupled to the pressure sensor 632 to allow a manual readout of the pressure. In one embodiment, the pressure sensor 632 and related components 622 may be located in a first module, such as a module on a the surface at a ship or drilling rig. The supercharge cylinder 114 and related components 620 may be located subsea, such as near a blowout preventer (BOP). In another embodiment, the components 622 may be located subsea, such as near the blowout preventer (BOP).

Figure 7:
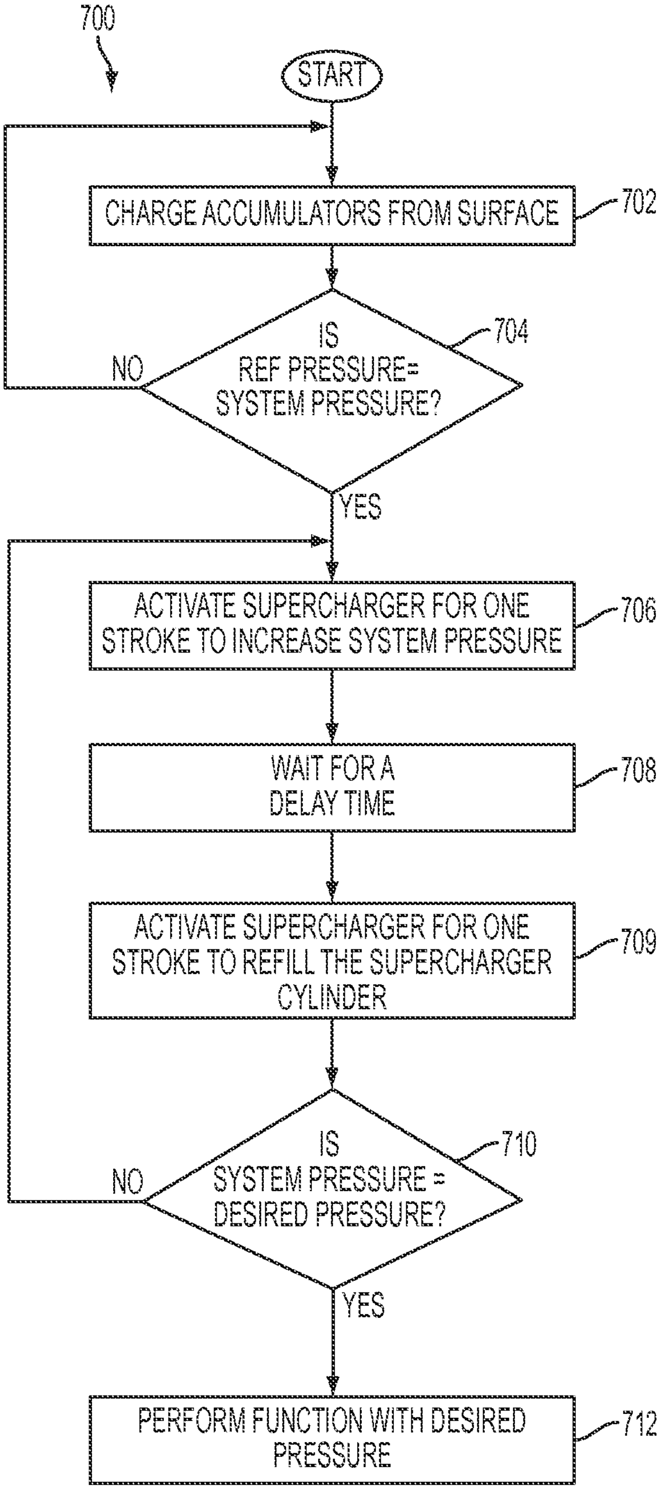
FIG. 7 is a flow chart illustrating one method of supercharging a hydraulic system to a desired pressure using feedback from the supercharger according to one embodiment of the disclosure.

A control module 602 may be coupled to the pressure sensor 632 and to the supercharge cylinder control valve 112. The control module 602 may execute algorithms for controlling the supercharge cylinder control valve 112 based on, for example, input from the pressure sensor 632 to obtain a desired pressure in the accumulators 118. FIG. 7 is a flow chart illustrating one method of supercharging a hydraulic system to a desired pressure using feedback from the supercharger according to one embodiment of the disclosure. A method 700 begins at block 702 with charging accumulators from the surface. At block 704, it is determined whether the system pressure is approximately equal to a reference pressure. In one example, a reference pressure may be 3000 or 5000 psi. If not, the method 700 returns to block 702 to continue charging the accumulators from the surface. If the system pressure is approximately equal to the reference pressure, then the method 700 proceeds to block 706.

At block 706, the supercharger is activated for one stroke of the supercharger cylinder to increase the system pressure. At block 708, optionally, a delay time may be implemented. At block 709, the supercharger may be activated for one stroke to refill the supercharge cylinder. Then, at block 710, it is determined whether the system pressure is approximately equal to a desired pressure. For example, a desired pressure may be 5000, 7500, or 10000 psi. If the desired pressure is not yet reached, then the method 700 may return to block 706 to activate the supercharger for another stroke of the supercharge cylinder to further increase the system pressure. When the desired pressure is obtained at block 710, then the method 700 may proceed to performing a function with the hydraulic pressure at the desired pressure. Block 712 may not be performed immediately when the desired pressure is obtained. That is, the desired pressure may be stored in the accumulators until an emergency occurs that requires actuation of components using the stored pressure.

Figure 8:
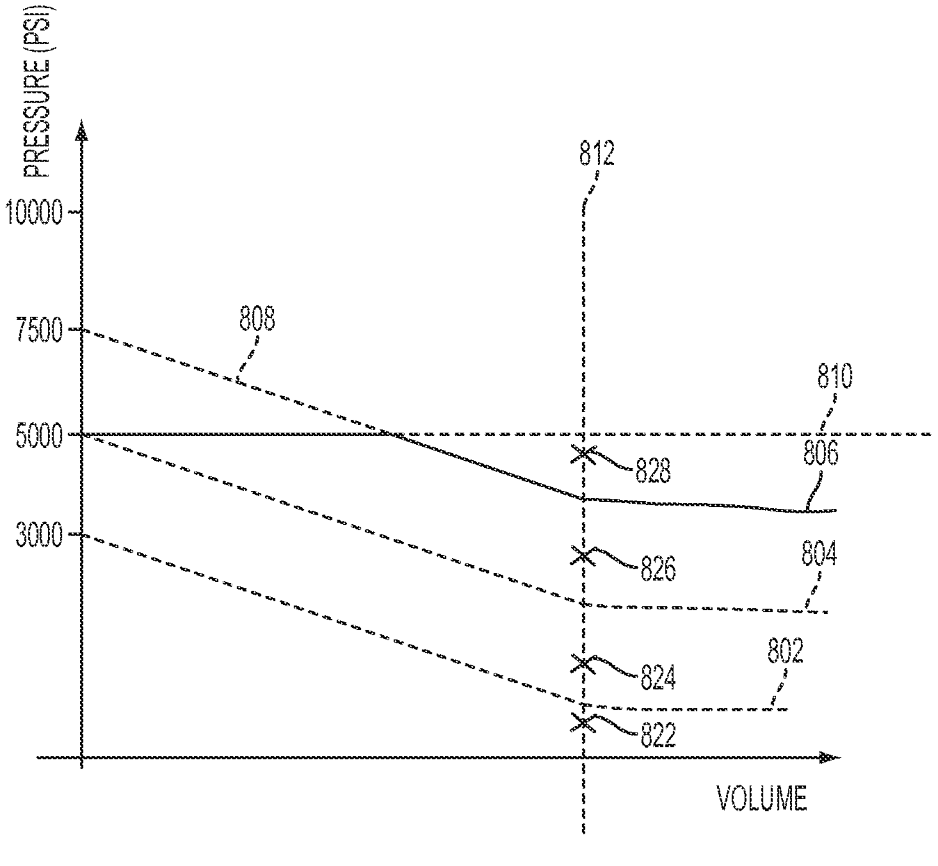
FIG. 8 is a graph illustrating increased pressure obtained at an end of a ram with one supercharged pressure according to one embodiment of the disclosure.

In one embodiment, the actuation of components at block 712 may be the actuation of a ram to shear a drillpipe. Higher pressures within the accumulators allow for larger and/or thicker drillpipe to be cut with the same shears. FIG. 8 is a graph illustrating increased pressure obtained at an end of a ram with one supercharged pressure according to one embodiment of the disclosure. The graph of FIG. 8 shows lines 802 and 804 demonstrating a pressure drop as the volume of fluid in the accumulators drops due to consumption in operation of the ram. Marks 822, 824, 826, and 828 are the pressures required at the end of the ram to shear certain drillpipes. For example, the mark 824 may mark a pressure required to shear a larger drillpipe than the drillpipe corresponding to mark 822.

When an initial pressure for the accumulators is 3000 psi, the line 802 illustrates that the pressure decreases as fluid is consumed such that the pipe 822 may be sheared but the pipes 824, 826, and 828 are not sheared. That is, the accumulator with 3000 psi contains insufficient pressure to operate the ram to cut drillpipes requiring pressure of marks 824, 826, and 828. Likewise for an initial pressure for the accumulators of 5000 psi, the line 804 illustrates that the pressure decreases as fluid is consumed such that pipes requiring pressures 826 and 828 are not sheared.

Conventionally, higher pressures are initially charged in the accumulators to allow shearing of larger drillpipes. For example, the increase of initial pressure from 3000 psi of line 802 to 5000 psi of line 804 may allow shearing of larger drillpipes. However, charging the accumulators to higher initial pressures from the surface becomes difficult. Use of a supercharge cylinder may allow an increased pressure to be obtained at the accumulators. For example, lines 806 and 808 illustrate an initial pressure obtained of 7500 psi that allows shearing of drill pipe corresponding to the pressure 826. The line 808 shows the higher initial pressure obtained in the accumulators. A pressure regulator may be set to limit the output of the accumulators to a regulated pressure 810. Thus, an output of the fluid for use by subsea systems may have a fixed pressure as fluid volume initially drops. The line 806 illustrates that the increased pressure through the use of the supercharge cylinder allows the drill pipe corresponding to pressure 826 to be sheared.

Figure 9:
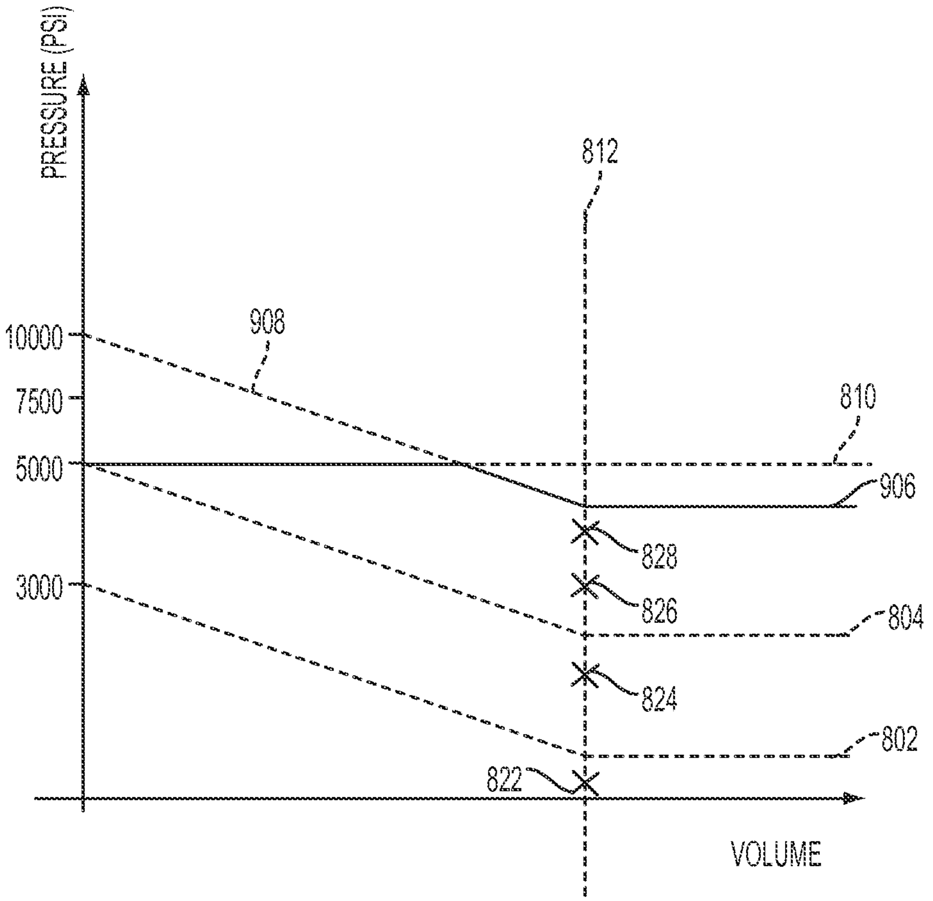
FIG. 9 is a graph illustrating increased pressure obtained at an end of a ram with another supercharged pressure according to one embodiment of the disclosure.

Higher pressures may be generated by the supercharge cylinder to allow larger drillpipes to be sheared. FIG. 9 is a graph illustrating increased pressure obtained at an end of a ram with another supercharged pressure according to one embodiment of the disclosure. Lines 906 and 908 illustrate an initial pressure obtained of 10000 psi that may allow shearing of drill pipe corresponding to the pressure 828.

The higher pressures achieved with the supercharge cylinder may improve the response of hydraulic systems in a blowout preventer (BOP), such as emergency response systems to cut and/or seal a drillpipe. For example, the higher pressures may increase the diameter or thickness of pipe that may be cut and/or sealed by the BOP. The increased pressure achieved with the supercharge cylinder may provide additional hydraulic fluid for operating these hydraulic systems without increasing a number of accumulators already present at the BOP. Further, a supercharge cylinder may be added onto existing BOP infrastructure to increase the capability of the existing BOP infrastructure.

If implemented in firmware and/or software, the functions described above, such as described with reference to FIG. 5 and FIG. 7, may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present processes, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:

an accumulator configured to store hydraulic fluid and gas;

a hydraulically-actuated subsea supercharge cylinder including:

a piston;

a first chamber on a first side of the piston; and a second chamber on a second side of the piston;

a hydraulic conduit configured to convey hydraulic fluid between the accumulator and the first chamber of the subsea supercharge cylinder;

a subsea supercharge cylinder control valve configured to be coupled to the subsea supercharge cylinder such that the control valve is movable between:

a first position in which hydraulic fluid that flows toward the subsea supercharge cylinder and through the control valve flows into the first chamber; and a second position in which hydraulic fluid that flows toward the subsea supercharge cylinder and through the control valve flows into the second chamber to stroke the subsea supercharge cylinder, thereby increasing pressure within the accumulator; and a control module coupled to the subsea supercharge cylinder control valve and configured to perform the steps of:

charging the accumulator to a base control system pressure; and stroking the subsea supercharge cylinder at least twice to increase pressure within the accumulator to a reference pressure that is above the base control system pressure.

2. The apparatus of claim 1, further comprising a pressure regulator coupled to the accumulator and configured to limit an output of the accumulator.

3. The apparatus of claim 1, further comprising a shear ram coupled to the accumulator and configured to operate using pressure supplied by the accumulator.

4. The apparatus of claim 3, wherein the accumulator is attached to a blowout preventer (BOP) that comprises the shear ram.

5. A method comprising:

charging an accumulator to a base control system pressure;

stroking a hydraulically-actuated subsea supercharge cylinder having a piston, a first chamber on a first side of the piston and in fluid communication with the accumulator, and a second chamber on a second side of the piston, wherein stroking the subsea supercharge cylinder is performed at least by supplying hydraulic fluid to the second chamber such that pressure within the accumulator is increased to or above a reference pressure that is above the base control system pressure;

directing hydraulic fluid at or above the reference pressure from the accumulator to a pressure regulator to reduce pressure of the directed hydraulic fluid to a reduced pressure; and directing hydraulic fluid at the reduced pressure from the pressure regulator to a shear ram of a blowout preventer (BOP) to actuate the shear ram to shear a drillpipe that is disposed in the BOP.

6. The method of claim 5, further comprising filling the first chamber of the subsea supercharge cylinder with hydraulic fluid from a reservoir at a surface.

7. The method of claim 5, wherein stroking the subsea supercharge cylinder is performed at least twice.

8. The method of claim 5, wherein stroking the subsea supercharge cylinder comprises moving a subsea supercharge cylinder control valve:

from a first position, in which hydraulic fluid flows through the control valve and into the first chamber; and to a second position, in which hydraulic fluid flows through the control valve and into the second chamber.

9. An apparatus comprising:

a hydraulically-actuated subsea supercharge cylinder comprising:

a piston;

a first chamber on a first side of the piston;

a second chamber on a second side of the piston;

a first input for receiving hydraulic fluid into the first chamber at a base control system pressure;

a second input for receiving hydraulic fluid into the second chamber at the base control system pressure; and an output in fluid communication with the first chamber for outputting hydraulic fluid at a reference pressure that is above the base control system pressure;

a hydraulic conduit configured to receive hydraulic fluid from the output; and a subsea supercharge cylinder control valve coupled to the subsea supercharge cylinder, the control valve being movable between:

a first position in which the control valve is configured to direct hydraulic fluid to the first input, but not to the second input; and a second position in which the control valve is configured to direct hydraulic fluid to the second input, but not to the first input, to stroke the subsea supercharge cylinder, thereby increasing pressure within the hydraulic conduit; and a one-way valve configured to prevent fluid from exiting the subsea supercharge cylinder through the first input.

10. The apparatus of claim 9, further comprising an accumulator configured to receive hydraulic fluid from the hydraulic conduit.

11. The apparatus of claim 9, further comprising a one-way valve configured to prevent fluid from entering the subsea supercharge cylinder through the output.

12. The apparatus of claim 10, comprising a pressure regulator configured to receive and reduce pressure of hydraulic fluid from the accumulator.

13. An apparatus comprising:

an accumulator configured to store hydraulic fluid and gas;

a hydraulically-actuated subsea supercharge cylinder including:

a piston;

a first chamber on a first side of the piston; and a second chamber on a second side of the piston;

a hydraulic conduit configured to convey hydraulic fluid between the accumulator and the first chamber of the subsea supercharge cylinder;

a subsea supercharge cylinder control valve configured to be coupled to the subsea supercharge cylinder such that the control valve is movable between:

a first position in which hydraulic fluid that flows toward the subsea supercharge cylinder and through the control valve flows into the first chamber; and a second position in which hydraulic fluid that flows toward the subsea supercharge cylinder and through the control valve flows into the second chamber to stroke the subsea supercharge cylinder, thereby increasing pressure within the accumulator; and a pressure regulator coupled to the accumulator and configured to limit an output of the accumulator.

14. The apparatus of claim 13, further comprising a control module coupled to the subsea supercharge cylinder control valve and configured to perform the steps of:

charging the accumulator to a base control system pressure; and stroking the subsea supercharge cylinder at least once to increase pressure within the accumulator to a reference pressure that is above the base control system pressure.

15. The apparatus of claim 14, wherein the control module is further configured to perform the step of stroking the subsea supercharge cylinder at least twice to increase pressure within the accumulator to the reference pressure.

16. The apparatus of claim 13, further comprising a shear ram coupled to the accumulator and configured to operate using pressure supplied by the accumulator.

17. The apparatus of claim 13, wherein the accumulator is attached to a blowout preventer (BOP) that comprises the shear ram.

18. An apparatus comprising:

a hydraulically-actuated subsea supercharge cylinder comprising:

a piston, a first chamber on a first side of the piston;

a second chamber on a second side of the piston;

a first input for receiving hydraulic fluid into the first chamber at a base control system pressure;

a second input for receiving hydraulic fluid into the second chamber at the base control system pressure; and an output in fluid communication with the first chamber for outputting hydraulic fluid at a reference pressure that is above the base control system pressure;

a hydraulic conduit configured to receive hydraulic fluid from the output; and a subsea supercharge cylinder control valve coupled to the subsea supercharge cylinder, the control valve being movable between:

a first position in which the control valve is configured to direct hydraulic fluid to the first input, but not to the second input; and a second position in which the control valve is configured to direct hydraulic fluid to the second input, but not to the first input, to stroke the subsea supercharge cylinder, thereby increasing pressure within the hydraulic conduit; and a one-way valve configured to prevent fluid from entering the subsea supercharge cylinder through the output.

19. The apparatus of claim 18, further comprising a one-way valve configured to prevent fluid from exiting the subsea supercharge cylinder through the first input.

20. The apparatus of claim 18, further comprising an accumulator configured to receive hydraulic fluid from the hydraulic conduit.

21. The apparatus of claim 20, comprising a pressure regulator configured to receive and reduce pressure of hydraulic fluid from the accumulator.

* * * * *